United States Patent

Peterson

[15] 3,684,022
[45] Aug. 15, 1972

[54] APPARATUS AND METHOD FOR INJECTION AND DISSEMINATION OF DRY FLY ASH IN MINE VOIDS

[72] Inventor: Carl A. Peterson, 153 W. Maple Ave, Hershey, Dauphin County, Pa. 17033

[22] Filed: July 21, 1971

[21] Appl. No.: 164,689

[52] U.S. Cl. ................................................. 169/2 R
[51] Int. Cl. ................................................. A62c 3/00
[58] Field of Search ........................... 169/2 R, 1 A

[56] References Cited

UNITED STATES PATENTS

| | | | |
|---|---|---|---|
| 1,280,254 | 10/1918 | Lide | 169/2 R X |
| 3,421,587 | 1/1969 | Heavilon et al. | 169/2 R |
| 3,500,934 | 3/1970 | Magnuson | 169/2 R |

*Primary Examiner*—M. Henson Wood, Jr.
*Assistant Examiner*—Thomas C. Culp, Jr.
*Attorney*—Frank J. Benasutti

[57] ABSTRACT

A supplemental source of compressed air is introduced near the discharge end of a conduit introducing air entrained dry fly ash into a mine void, to maintain the free flow characteristic of a fly ash mixture for a greater time and distance than would be the case without such introduction of supplemental air. A diffuser is used to disseminate the supplemental air into a plurality of streams.

12 Claims, 3 Drawing Figures

INVENTOR.
Carl A. Peterson

BY

ATTORNEY.

APPARATUS AND METHOD FOR INJECTION AND DISSEMINATION OF DRY FLY ASH IN MINE VOIDS

BACKGROUND OF THE INVENTION

This invention relates to an improvement in the presently used methods and apparatus for injecting and disseminating dry fly ash into mine voids through boreholes from the ground surface to the mine void, and more particularly, to a method and apparatus of injecting supplemental air into the dry fly ash mixture as it is discharged within the mine void.

Prior art methods and apparatus are shown in U.S. Pat. Nos. 3,421,587 issued Jan. 14, 1969 to J. L. Heavilon, et al. and 3,500,934 issued Mar. 17, 1970 to M. O. Magnuson. These patents detail the apparatus and methods currently used as well as the types of materials and mixtures used and the purposes for which they are used. For purposes of simplicity in describing the present improvement, the disclosures of these patents are incorporated herein by reference. Suffice it to say that the apparatus and methods previously used inject fly ash in a fluidized state, usually with compressed air, through a pipe in a borehole into the mine voids. Fluidization is accomplished by introducing compressed air into a settled mass of dry fly ash usually from the underside. The particles of the fly ash are of such very small diameter and weight that upon introduction of compressed air by suitable means they are suspended in air and respond to a hindered settling effect as a result of the individual particles being separated and bounded by very thin films of air. The suspension of dry fly ash in air thus created, behaves in the manner of a fluid in that it flows laterally and comes to rest only as the fly ash particles settle out of suspension. This requires a short period of time. The lateral movement of finely particulate matter by fluidization in air is not dependent on the velocity of impact of the compressed air. The air may be injected under the fly ash in any direction including the vertical. A hydraulic analogy to the suspension of dry fly ash in air would be quicksand, which is a suspension of sand in water and which flows in the manner of a fluid.

By the methods heretofore used the dry fly ash and air comes down the borehole and the fly ash is deposited in the mine void directly under the injection borehole; accumulating until it contacts the roof of the mine void. Because of its finely particulate nature the fly ash flows but a short distance beyond the borehole in the ceiling of the mine void and thus makes contact with the roof of the mine void after having travelled only a limited lateral distance.

SUMMARY OF THE INVENTION

My invention is an improvement upon the prior art methods in that it provides a means for prolonging the fluidized state of a dry fly ash (or other finely particulate material) mixture thereby allowing it to travel laterally a greater distance than was heretofore possible. The effect is to cause the injection hole to accept a greated quantity of fly ash and make the fly ash seal or contact a greater area of the mine void than would be the case without the use of my invention. The apparatus and process in accordance with the present invention provides a means for introducing supplemental air at the discharge end of the hole within the mine void while the dry fly ash is in a fluid state, and changing the direction of this fluid while maintaining it in a fluid state for a longer period of time. In the most preferred embodiment the supplemental air is introduced through a diffuser which breaks the air into a plurality of small streams for introduction into the mainstream of fluidized dry fly ash.

Accordingly, it is an object of this invention to improve present methods of dry fly ash injection by providing a means for prolonging the fluidization of the dry fly ash after discharge from the injection means in mine voids.

This, and other objects of my invention, will become apparent from the following description with reference to the accompanying drawings.

DESCRIPTION OF THE PREFERRED EMBODIMENTS

Figure 1:
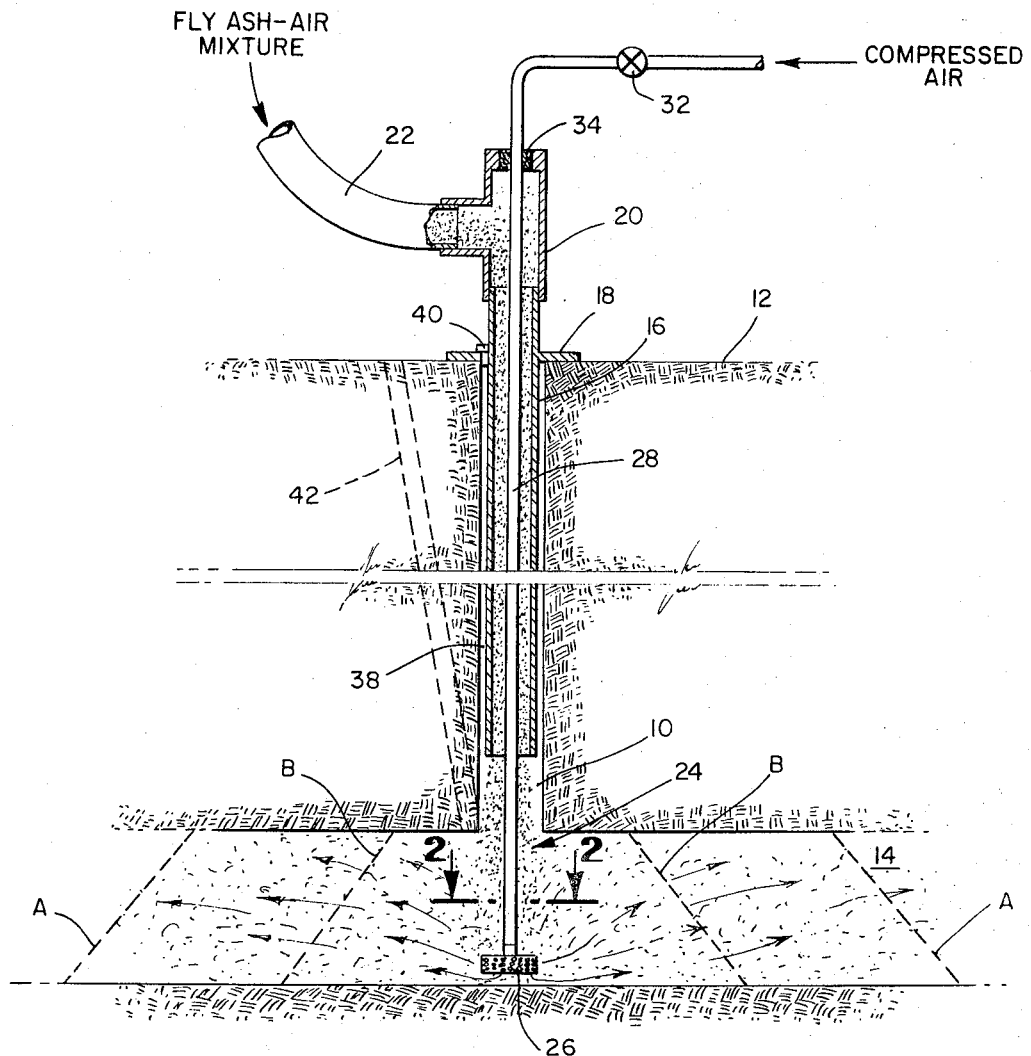
FIG. 1 is a foreshortened vertical sectional view partially broken away showing the overall arrangement for the introduction of dry fly ash into a mine void in accordance with the preferred embodiment of my invention.

Although specific forms of the invention have been selected for illustration in the drawings and the following description is drawn in specific terms for the purpose of describing these forms of the invention, this description is not intended to limit the scope of the invention which is defined in the appended claims.

FIG. 1 shows a portion of a system for injecting fluidized dry fly ash into a mine void. Reference is made to the previously mentioned U.S. patents for the details of the fly ash, fly ash container and method and apparatus for introducing it through the pipe into the mine void. For purposes of this application, I have shown a hole 10 (foreshortened) which extends from the ground surface 12 through the ground to the mine void 14. Mounted within this hole is a pipe 16 supported by a flange 18 or other suitable means well known in the art. The upper end of the pipe is connected by means of a tee 20 to a flexible hose 22 which introduces the fly ash and air mixture from the container (not shown). The fly ash mixture proceeds down the pipe in a fluidized state and is ejected at 24 into the mine void.

In accordance with the preferred embodiment of my invention air is introduced at a point somewhat below the opening into the mine void.

The heighth of the mine void cavity may range from two or three feet to twelve feet or more. It is desirable in accordance with my invention to permit the fluidized dry fly ash to enter the void and to introduce air into it preferably while it is still in a fluidized state. Accordingly, the introduction of supplemental air must be at a point spaced below the opening into the mine void. For example, for a 12 foot high cavern the introduction of air would be at about 3 to 5 feet below the opening in the ceiling of the cavern.

Figure 2:
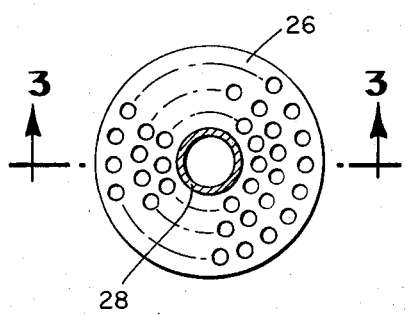
FIG. 2 is a greatly enlarged plan view of the diffuser portion of the apparatus taken as indicated by lines and arrows 2—2 in FIG. 1.
Figure 3:
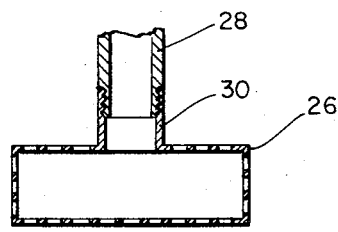
FIG. 3 is a section of the diffuser and its adjoining pipe taken as indicated by the lines and arrows 3—3 in FIG. 2.

The air is introduced through a perforated disc-shaped member 26 shown in greater detail in FIGS. 2 and 3. The disc shown is cylindrical and made of a metallic material and has perforations in both the radial surfaces at the top and bottom and the circumferential side surface. The diameter of the disc is less than the inside diameter of the pipe 16 so that the disc can be readily inserted through the pipe into the cavern or mine void. To give some idea of the dimensions involved, for a 8-inch borehole, a 6-inch pipe 16 could be used and the diffuser 26 could be 4 inches in diameter. The diffuser hole proportions would be substantially those shown in FIGS. 2 and 3. The compressed air flexible hose 28 would be on the order of one to two inches or larger as necessary and can be made of a flexible material or one or more sections of rigid pipe threaded into the upper flange 30 (FIG. 3) of the diffuser 26.

The upper end of the hose 28 has a valve illustrated schematically at 32 in FIG. 1 for regulating the compressed air from a source not shown. It is, of course, possible to use the same compressed air source as is used in furnishing the air to the dry fly ash mixture initially, by any suitable valving as would be well known in the art. The pressure can then be adjusted as desired for operating conditions given the quantity of fly ash, the pressure at which it is introduced into the chamber, the length of the pipe and other factors well known in the art.

It will be appreciated by those skilled in the art that the pressure of the compressed air introduced through the diffuser and the position of the diffuser should be adjusted to accommodate environmental conditions and parameters well known in the art. Likewise, the diameter of perforations in the diffuser should be controlled to accomplish the desired distribution of air to all the perforations with a minimal frictional resistance to the flow of air thereto. The perforations shown provide separate and distinct air streams into the mixture coming down the pipe 28 and being discharged at 24 into the cavern. These airstreams unite with the discharged fluidized fly ash and prolong the fluidization of the fly ash within its course of travel in the chamber. This prolongation is indicated by the outer truncated cone shown by the lines A—A. These lines illustrate the contact line of the settled fly ash with the bottom and roof of the mine void when the perforated disc 26 is used in accordance with my invention. The diffusion of the fluidized fly ash is shown by the arrows and scatter pattern illustrated in FIG. 1.

Without such a diffuser for the introduction of supplemental air at the discharge into the mine void, the fly ash would settle out much faster, that is, it would not travel laterally as far, and the contact line of the settled fly ash with the roof and the floor of the mine void would be much closer to the introduction of the fly ash, as illustrated by the truncated cone shown by the lines B—B in FIG. 1.

It is desirable to prevent channeling of airstreams through the fly ash and for this purpose I have made provision for a rotatable packing gland 34 at the upper end of the tee 20 through which the conduit 28 passes. This allows for rotation of the conduit supplying the air.

Any suitable means can be provided for adjusting the height of the conduit within the chamber such as, for instance, locking the upper end thereof in the packing gland 34.

I further contemplate using a pleated plastic or fabric bag or screen having perforations or meshes for the escape of air in place of the rigid perforated disc 26. Alternatively, although less desirable, the supplemental air supply 28 could terminate within the chamber without a diffuser so that air would escape freely and be introduced into the fly ash mixture being introduced into the chamber.

Mine voids are generally connected with the outside atmosphere at more or less distant points from the introduction of the fly ash mixture. These provide an alternate path for escape of entrained and supplemental air. Injection of dry fly ash through a borehole may progress to the stage of refusal, however, at which stage the settled fly ash (or other particulate matter) makes a seal or complete circumferential contact with the roof of the mine void at some radius from the injection hole. The escape into the surrounding mine void of air in which the dry ash is suspended, is then cut off. To permit complete filling of the mine void up to and into the injection borehole, I have provided an alternate escape path to the outside atmosphere for the entrained air. This path 38 is between the pipe 16 and the borehole 10. A plurality of plugs 40 are disposed through the plate 18 and these can be removed in order to permit the air to escape.

Alternatively, an alternate air escape path may be provided by an air escape borehole drilled adjacent to the injection borehole and near enough to the hole's entrance into the mine void to permit complete filling of the mine void. Of course, this is a more expensive procedure and is less desirable than providing a space between the standpipe 16 and the initial borehole 10. Such an alternative hole is illustrated in FIG. 1 by the dash lines 42. The distance separating the injection borehole and the air escape borehole should be the minimum distance possible consistent with good drilling practice. A soil casing pipe (not shown) can be inserted into the air escape borehole which can then be lightly capped at the surface until the refusal stage is reached; which will be signaled by an increase in the emission of air and dust from the air escape borehole. If the cap is screwed on tightly, a pressure gauge may be attached through the air escape borehole cap or the injection borehole plug to signal the build-up of back pressure indicating the approaching refusal stage of the injection process. When the refusal stage is reached, the soil pipe can be removed or the plug 40 can be removed permitting air to escape. As this stage is reached, it is desirable to slowly remove the perforated disc by withdrawing the pipe or conduit 28.

Of course, as the precess of completing the filling of the mine void nears termination, it is not necessary to continue to supply supplemental air in order to prolong the fluidization process. Accordingly, the valve 32 can be closed and the pipe 28 removed allowing the fluidized fly ash air mixture to fill the remaining hole.

As will be appreciated by those skilled in the art, within good practice, both the injection borehole and the air escape borehole are provided with soil casing pipes which extend from the surface of the ground through the soil and into the solid rock strata into which the pipes are securely embedded with grout of sufficient strength to resist leakage of the compressed air during the process. Further, suitable dust collecting equipment (not shown) may be used as necessary.

It will be understood that various changes in the details, materials and arrangement of parts which have been herein described and illustrated in order to explain the nature of this invention, may be made by those skilled in the art within the principle and scope of the invention as expressed in the following claims.

For example, it should be possible within the scope of this invention to use nitrogen or other gasses or gas mixtures other than air and to use particulate matter of a suitable size amenable to injection and fluidization, and further, to fill other voids and cavities or spaces other than mine voids.

The "Abstract of the Disclosure" set forth above is intended to provide a non-legal technical statement of the contents of the disclosure in compliance with the Rules of Practice of the United States Patent Office, and is not intended to limit the scope of the invention described and claimed herein.

What is claimed is:

1. A process of introducing supplemental air into a chamber into which fluidized particulate matter is being introduced, comprising the step of introducing compressed gas at a point spaced from the point at which the fluidized material is being introduced into the chamber and releasing this compressed gas into the material as it enters the chamber while said material is still in a fluidized state.

2. The invention of claim 1 with the additional step of diffusing the compressed gas so introduced into said fluidized material.

3. The invention of claim 2 wherein said diffusion consists of dividing said compressed gas into a plurality of separate streams of gas prior to introducing it into the fluidized material.

4. An apparatus for prolonging the fluidization of finely divided particulate matter being introduced into a chamber, comprising: means for introducing a supplemental supply of compressed gas into the fluidized matter after its entry into the chamber while it is still in fluid state.

5. The invention of claim 4 wherein said means comprises a supplemental source of compressed gas, and conduit means connected at one end to said source and having an outlet at another end within said chamber.

6. The invention of claim 5 wherein said conduit terminates in a diffuser within said chamber.

7. The invention of claim 6 where said diffuser comprises a disc having a plurality of perforations therein.

8. The invention of claim 6 wherein said diffuser comprises a means for dividing the compressed gas into a plurality of separate streams.

9. The invention of claim 5 wherein said conduit passes through a pipe, said pipe providing the means for introducing said particulate matter into said chamber.

10. The invention of claim 6 wherein said diffuser is spaced below the entrance of the fluidized particulate matter in said chamber.

11. Invention of claim 5 wherein said outlet is rotatable within said chamber.

12. Invention of claim 4 wherein additional means are provided connected to said chamber for exhausting the supplemental supply of compressed gas therefrom.

* * * * *